(12) United States Patent
Dooley

(10) Patent No.: US 8,489,246 B2
(45) Date of Patent: Jul. 16, 2013

(54) HYBRID CONTROL SYSTEM

(75) Inventor: Kevin Allan Dooley, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 284 days.

(21) Appl. No.: 12/713,868

(22) Filed: Feb. 26, 2010

(65) Prior Publication Data

US 2011/0213507 A1   Sep. 1, 2011

(51) Int. Cl.
*G05B 13/00* (2006.01)

(52) U.S. Cl.
USPC ............................ 700/287; 361/15; 66/773

(58) Field of Classification Search
USPC ..................... 700/6, 278; 361/15; 66/773
See application file for complete search history.

(56) References Cited

U.S. PATENT DOCUMENTS

| | | | |
|---|---|---|---|
| 3,984,665 A | 10/1976 | Shriver et al. | |
| 4,019,315 A * | 4/1977 | Yannone et al. | 60/773 |
| 4,031,407 A * | 6/1977 | Reed | 307/87 |
| 4,051,669 A * | 10/1977 | Yannone et al. | 60/773 |
| 4,195,231 A * | 3/1980 | Reed et al. | 290/40 R |
| 4,208,591 A * | 6/1980 | Yannone et al. | 290/40 R |
| 4,259,835 A * | 4/1981 | Reed et al. | 60/39.281 |
| 4,283,634 A * | 8/1981 | Yannone et al. | 290/40 R |
| 4,302,931 A | 12/1981 | White et al. | |
| 4,308,463 A * | 12/1981 | Giras et al. | 290/40 R |
| 4,314,441 A * | 2/1982 | Yannone et al. | 60/39.281 |
| 4,380,146 A * | 4/1983 | Yannone et al. | 60/790 |
| 4,504,905 A | 3/1985 | Burrage | |
| 4,536,126 A * | 8/1985 | Reuther | 290/40 R |
| 4,745,541 A | 5/1988 | Vaniglia et al. | |
| 5,137,346 A | 8/1992 | Sattler et al. | |
| 5,231,341 A | 7/1993 | Sang-Gwon | |
| 6,944,562 B2 | 9/2005 | Lee et al. | |
| 7,161,426 B2 | 1/2007 | Hu et al. | |
| 2003/0147186 A1 * | 8/2003 | Schultz et al. | 361/15 |

FOREIGN PATENT DOCUMENTS

| | | |
|---|---|---|
| CA | 1070387 | 1/1980 |
| EP | 0025406 A1 | 3/1981 |
| EP | 1712761 A2 | 10/2006 |
| GB | 2023237 A | 12/1979 |
| JP | 56166501 | 12/1981 |
| WO | 0127468 A2 | 4/2001 |

OTHER PUBLICATIONS

European search report; EP application No. 11162762.6 dated Oct. 26, 2011.

* cited by examiner

*Primary Examiner* — Mohammad Ali
*Assistant Examiner* — Anthony Whittington
(74) *Attorney, Agent, or Firm* — Norton Rose Fulbright Canada LLP

(57) ABSTRACT

A hybrid control system for controlling an electric machine coupled to a gas turbine engine is provided. The control system comprises: a primary analog control loop including an analog controller for controlling the electric machine based on a set point and a measured output of the electric machine; and a digital controller of the turbine engine operationally connected to the primary analog control loop to adjust at least one control parameter associated with the analog controller.

20 Claims, 3 Drawing Sheets

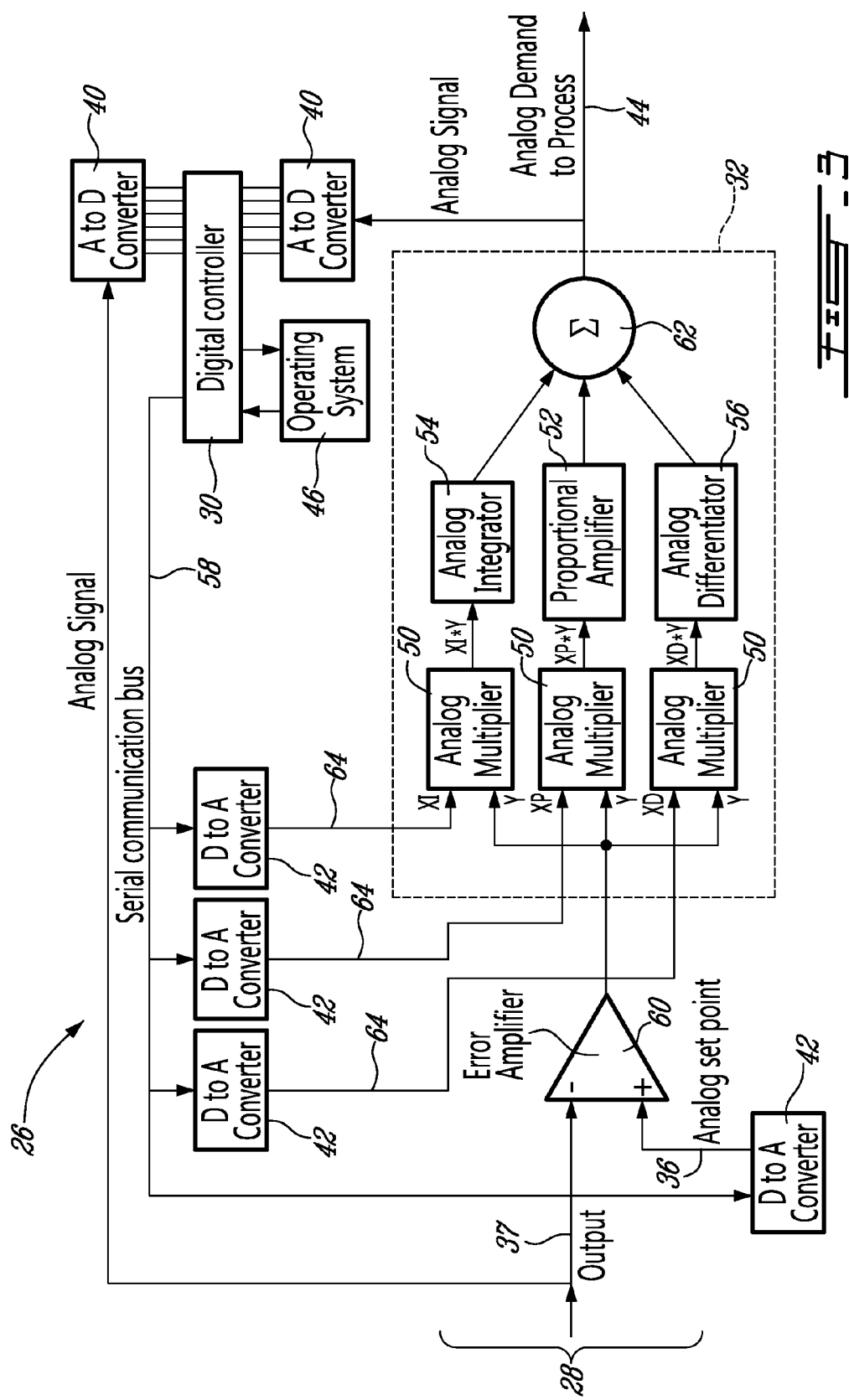

HYBRID CONTROL SYSTEM

TECHNICAL FIELD

The disclosure relates generally to control systems, and more particularly to hybrid analog and digital control systems.

BACKGROUND OF THE ART

In power control systems incorporating microprocessors as part of the primary control loop, the microprocessors can be subjected to event upsets which may disrupt primary control functions of such control systems. Event upsets may cause serious voltage spikes or power failures and consequently damage to power system components. In particular, event upsets may occur in microprocessors operating at high altitude due to high energy cosmic particle impact such as on an aircraft during flight for example.

Improvement in control systems is therefore desirable, and it is an object of the present disclosure to provide such improvement.

SUMMARY

The disclosure describes electric machines, and in particular improved systems, devices, and processes for hybrid control of electric machines coupled to gas turbine engines. In some aspects, a control system according to the disclosure comprises a primary analog control means, such as a loop including an analog controller for controlling the electric machine based on a set point and a measured output of the electric machine; and a digital controller means of the turbine engine operationally connected to a primary analog control loop to adjust at least one control parameter associated with the analog controller.

In further aspect the disclosure describes methods for control of electric generators coupled to a gas turbine engines. A method according to such aspect comprises controlling, using analog techniques and devices, an output of the generator based on a set point, a measured output of the generator and at least one control parameter; and adjusting the at least one control parameter based on a digitally derived signal.

a primary analog means for controlling the machine based on a set point and a measured output of the generator; and a digital control means of the gas turbine engine connected to the primary analog means, the digital control means being configured to supervise the operation of the primary analog means.

Further details of these and other aspects of the subject matter of this application will be apparent from the detailed description and drawings included below.

DESCRIPTION OF THE DRAWINGS

Reference is now made to the accompanying drawings, in which:

FIG. 3 is a schematic illustration showing details of the hybrid control system of FIG. 2.

DETAILED DESCRIPTION OF THE PREFERRED EMBODIMENTS

Various aspects of preferred embodiments are described through reference to the drawings.

Figure 1:
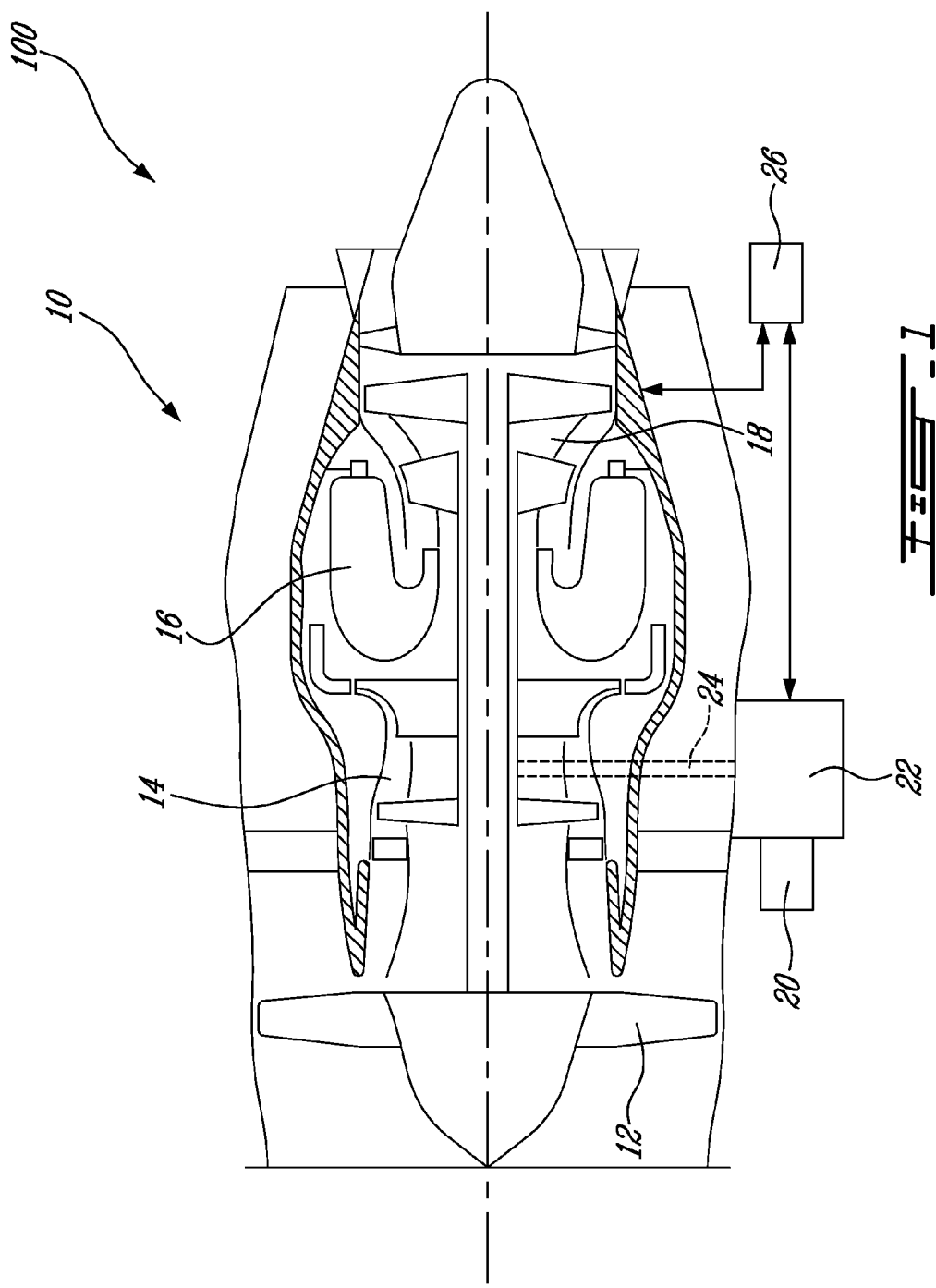
FIG. 1 is an axial cross-section view of a turbo-fan gas turbine engine.

FIG. 1 shows an aircraft propulsion and power generation system 100 useful for illustrating aspects of systems and methods according to the disclosure. In the embodiment shown, system 100 comprises gas turbine engine 10, electric machine 20, and hybrid control system 26. Gas turbine 10 comprises, in serial flow communication, fan 12, through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases. Electric machine 20 may be mechanically coupled to a rotating component of engine 10 via accessory gearbox (AGB) 22 and tower shaft 24. Electric machine 20 may, for example, be configured to be operated as a starter/generator, a starter or a generator. Hybrid control system 26 may be configured to monitor any control or feed-back current, voltage, or other signal convertible to electromagnetic form and useful for representing any one or more operating parameters of system 100, or any components thereof.

Figure 2:
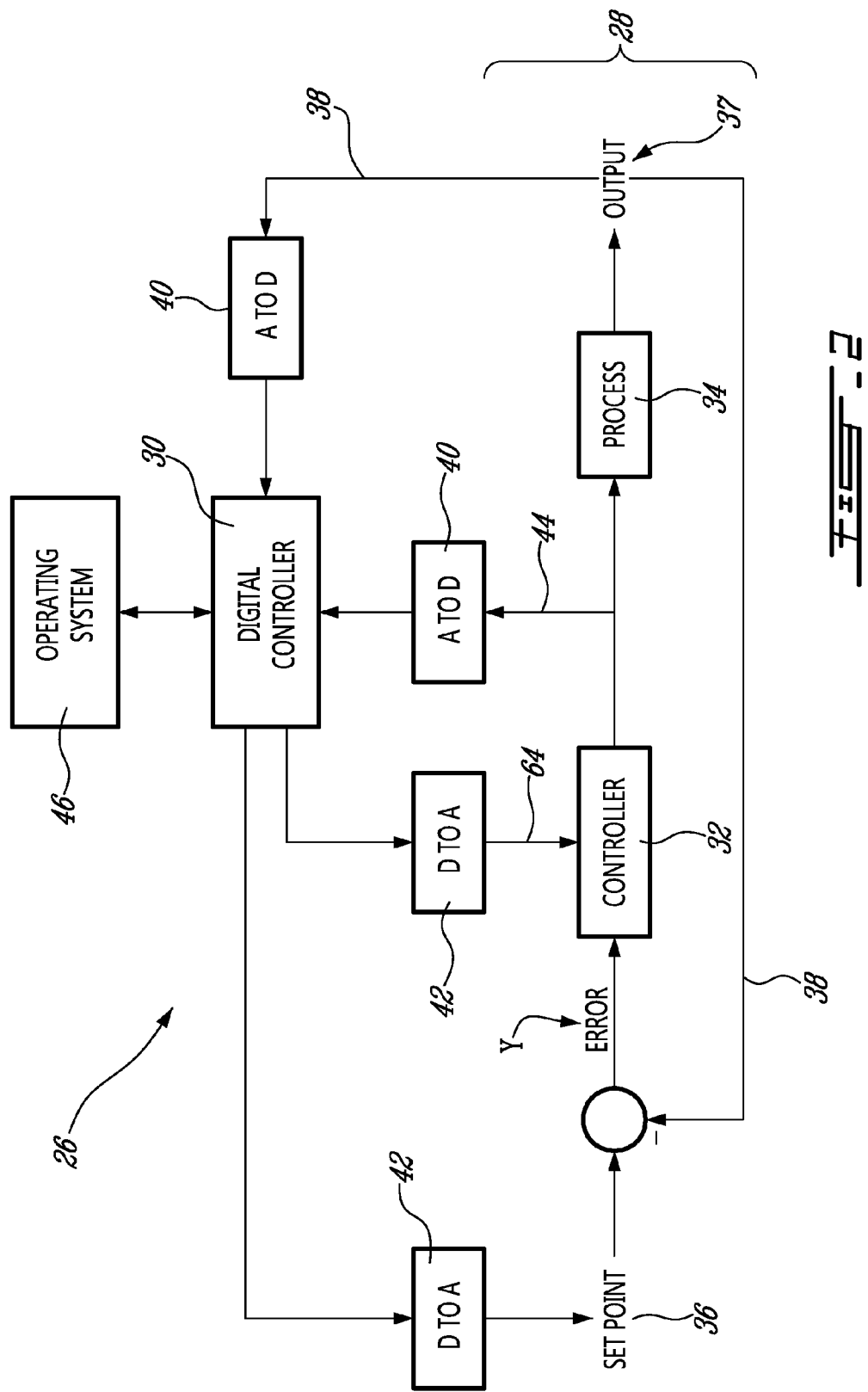
FIG. 2 is a schematic illustration of a hybrid control system according to one embodiment.

FIG. 2 schematically illustrates an illustrative embodiment of a hybrid control system 26 according to the disclosure herein. In the embodiment shown, control system 26 comprises a primary analog control loop 28 and a digital controller 30 operationally connected to primary analog control loop 28. Digital controller 30 may include or incorporate one or more digital controller of gas turbine engine 10, such as a full authority digital engine controller (FADEC) of gas turbine engine 10. Primary analog control loop 28 includes analog controller 32 for controlling process(es) 34 based on set point(s) 36 and measured output(s) 37. Measured output(s) 37 may be obtained from the output of process(es) 34 via appropriate sensor(s), which may be conventional and which, for clarity and convenience, are not shown. Analog controller 32 may be a proportional-integral-derivative (PID) controller and may therefore make use of control parameters associated with its proportional, integral and derivative functions. Digital controller 30 may be connected to analog controller 32 and be configured to supervise the operation of the analog control loop 28. Digital controller 30 may be connected to analog controller 32 to permit adjustment of at least one of the parameters associated with the proportional, integral and derivative functions of analog controller 32 based on a signal from digital controller 30.

Process(es) 34 may include any process(es) suitable for implementation or control using closed-loop control techniques. For example, a control system 26 may be used to control desired outputs such as: temperature, pressure, rotational speed of a shaft, position of a movable member, and/or output voltage of a generator. Accordingly, a control system 26 may, for example, be used to control the output voltage of an electric machine 20, such as an electric generator, driven by a gas turbine engine 10, as shown in FIG. 1. Gas turbine engine 10 may be used to propel an aircraft (not shown).

Digital controller(s) 30 may be connected for communication with primary analog control loop 28 via, for example, suitably-configured analog-to-digital (A-to-D) converters 40 and/or digital-to-analog (D-to-A) converters 42. Specifically, for example, digital controller(s) 30 may be connected to receive measured output(s) 37 via connection(s) 38 and analog demand signal(s) supplied to process(es) 34 via connection(s) 44 and A-to-D converters 40. Digital controller(s) 30 may also be connected to provide set point(s) 36 to primary analog control loop(s) 28 via D-to-A converter(s) 42. D-to-A converter(s) 42 may be configured to hold a last valid requested value in the event of a malfunction or resetting of digital controller(s) 30. Digital controller(s) 30 may also communicate with analog controller(s) 32 via D-to-A converter(s) 42 and connection(s) 64, so as to adjust control parameters within analog controller(s) 32. Control parameters adjustable by digital controller(s) 30 may be associated with the proportional, integral and derivative functions of analog controller(s) 32. Such control parameters adjustable by digital controller(s) 30 may also be representative of frequency response(s) of primary analog control loop(s) 28. Digital controller(s) 30 may also be connected to one or more operating system(s) 46. Operating system(s) 46 may provide operating instructions for process(es) 34, from which set point(s) 36 may be determined and provided to primary analog control loop(s) 28. Operating system(s) 46 may be connected for bi-directional communication with an external communication bus (not shown). The external communication bus may be associated with an avionics system of an aircraft. Set point(s) 36 may be combined with measured output(s) 37 in order to determine error signal(s) Y to be supplied to analog controller(s) 32.

FIG. 3 schematically illustrates a specific exemplary embodiment of a hybrid control system 26 such as that shown more generically in FIG. 2. A process 34 is not specifically shown in FIG. 3, but may for example include the control of the output of electric machine 20 operating as a generator while being coupled to gas turbine engine 10. Output(s) may include the output voltage(s) of electric machine(s) 20 operating as generator(s). Digital controller(s) 30 may include microprocessor(s) 31. Digital controller(s) 30 may also include or incorporate one or more digital controller of a gas turbine engine 10, such as a full authority digital engine controller (FADEC) of gas turbine engine 10. Again, operating system(s) 46 may be connected for bi-directional communication with an external communication bus (not shown).

Analog controller 32 may be a PID controller which comprises: analog multiplier 50 and proportional amplifier 52 as part of its proportional function; analog multiplier 50 and analog integrator 54 as part of its integral function; and, analog multiplier 50 and analog differentiator 56 as part of its derivative function. Serial bus 58 and D-to-A converter 42 may be used to communicate set point 36 to amplifier 60 where it may be combined with measured output 37 to provide an error signal Y to analog controller 32. Serial bus 58 and D-to-A converters 42 may also be used for adjustment of control parameters within analog controller 32 by digital controller(s) 30. Outputs from proportional amplifier 52, analog integrator 54, and analog differentiator 56 are combined at combiner 62 to produce an analog demand signal for process 34. Adjustment to the PID functions may be provided in the form of gains XP, XI and XD which are multiplied with error signal Y in analog multipliers 50 for each respective proportional, integral and derivative function. An offset adjustment (not shown) could also be supplied to amplifier 60 via another D-to-A converter 42.

During operation, primary analog control loop 28 may be used to control process(es) 34 while digital controllers(s) 30 are, for example, restricted to providing only initialization, ongoing supervisory, and optimization functions. Optimization functions provided by digital controller(s) 30 may be in the form of digitally derived signals and may be based on set point(s) 36 and signals received from primary analog control loop(s) 28 and from an external serial bus. For example, signals representative of measured output(s) 37 and analog demand(s) to process(es) 34 may be provided to corresponding digital controller(s) 30.

A control system 26 may be of hybrid nature, in that it combines the benefits of a stable and reliable analog control loop with the benefits of variable control parameters and fine tuning provided by a digital controller. Accordingly, control system 26 provides an analog control circuit which has digitally variable gains and frequency response parameters. The digitally derived signals may be used to change the analog computation characteristics of primary analog control loop 28.

Analog control loops are typically very reliable but may, for example, be subject to long term drift and/or other accuracy issues, and typically would have fixed gains and frequency responses. Digital control systems, on the other hand, may have a variable gain and frequency response controlled by an active running program. Digital control systems can therefore be programmed to account for non-linearities in process(es) 34. However, the operation of digital control systems may be seriously impacted by event upsets such as, for example, cosmic particle absorption or a momentary power supply interruption. During such event upsets, the program being executed by the digital computer may become corrupt and/or halt the operation of the digital control system. The execution of a reset routine may be triggered to re-establish the operation of the digital control system.

In aircraft power control systems incorporating microprocessors as part(s) of the primary control loop(s), event upsets which may occur during flight can cause serious voltage spikes or power failures which can damage power system components. Event upsets may be more likely to occur in microprocessors operating at high altitude due to high energy cosmic particle impact for example. Full authority digital engine control (FADEC) systems often use two separate redundant microprocessor systems to provide means to avoid loss of control as a result of a system failure. A brief system failure due to an event upset is generally not critical since the system can switch over to another channel within a few milliseconds which is sufficient to maintain control of a gas turbine engine. However, for power control applications, a similar very brief fault within a high power controller could result in permanent damage to internal components or in excessive voltage being supplied to an aircraft power bus for a brief period and may result in damage to other aircraft systems.

Advantageously, control system 26 combines the benefits of both analog control and digital control to provide a control architecture that is stable, reliable and immune to faults such as event upsets and hidden software bugs. In some embodiments, digital controller(s) 30 may not directly control process(es) 34, but may instead play supervisory role(s) for main analog control loop(s) 28. Digital data provided to D-to-A converters 42 from digital controller(s) 30 may be periodically updated as required for control optimization or for set point or offset adjustments. D-to-A converters 42 may be configured to hold current digital value(s) supplied by digital controller(s) 30 and continuously output analog signal(s) to primary analog control loop(s) 28 until new digital value(s) are supplied by digital controller(s) 30. Therefore, if, for example, for whatever reason signals from a digital controller 30 become unavailable, a primary analog control loop 28 may continue to control a process 34 using the last values transmitted to D-to-A converters 42 from the digital controller 30. The control system 26 can remain in its last normal operating condition should digital controller 30 be interrupted by an event upset or an unexpected software hang-up. Thus, a primary analog control loop 28 may continue to maintain control of a process 34 until the digital controller 30 restarts and comes back online.

Failure or hang-ups of digital controller 30 do not interfere with the normal operation of primary analog control loop 28. Control of process 34 may not be interrupted by momentary malfunctions of digital controller 30 but, at the same time, benefit from the long and short term accuracy of digital controller 30 which may be programmable to account for variations in the non-linearity, gain or frequency response of process 34. A watchdog timer (not shown) may be provided to detect hang-ups with digital controller 30 and take appropriate actions to re-set digital controller 30.

The above description is meant to be exemplary only, and one skilled in the art will recognize that changes may be made to the embodiments described without departing from the scope of the invention disclosed. For example, hybrid control system 26 may be used to control other types of processes. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. Still other modifications which fall within the scope of the present invention will be apparent to those skilled in the art, in light of a review of this disclosure, and such modifications are intended to fall within the appended claims.

What is claimed is:

1. A hybrid control system for controlling an electric machine coupled to a gas turbine engine, the control system comprising:
   a primary analog control loop including an analog controller for controlling the electric machine based on a set point and a measured output of the electric machine; and
   a digital controller of the turbine engine operationally connected to the primary analog control loop via at least one digital-to-analog converter to adjust at least one control parameter associated with the analog controller, the at least one digital-to-analog converter being configured to hold at least one last value received from the digital controller;
   wherein the primary analog control loop is configured to control the electric machine during an interruption in the operation of the digital controller using the at least one last value held by the at least one digital-to-analog converter.

2. The control system as defined in claim 1, wherein the at least one control parameter is associated with at least one of a proportional function, an integral function and a derivative function.

3. The control system as defined in claim 1, wherein the digital controller is configured to supply the set point to the primary analog control loop.

4. The control system as defined in claim 3, wherein the digital controller comprises a microprocessor.

5. The control system as defined in claim 3, wherein the digital controller is connected to the analog control loop to receive a signal representative of the measured output of the electric machine.

6. The control system as defined in claim 1, wherein the at least one control parameter comprises at least one of a gain associated with a proportional function, a gain associated with an integral function and a gain associated with a derivative function.

7. The control system as defined in claim 6, wherein the digital controller is connected to the analog control loop to receive a signal representative of the measured output of the electric machine.

8. The control system as defined in claim 7, wherein the digital controller is connected to the analog control loop to receive a demand signal.

9. The control system as defined in claim 8, wherein the digital controller is configured to supply the set point to the primary analog control loop.

10. A method for the analog control of an electric generator coupled to a gas turbine engine, the method comprising:
    controlling an output of the generator using an analog controller based on a set point, a measured output of the generator and at least one control parameter;
    receiving at least one digitally derived signal, adjusting the at least one control parameter for the analog controller based on the at least one digitally derived signal;
    holding the at least one digitally derived signal received; and
    conditioned upon a subsequent digitally derived signal not being received, continuing to control the output of the generator using the analog controller based on the at least one digitally derived signal being held.

11. The method as defined in claim 10, wherein the at least one control parameter is associated with at least one of a proportional function, an integral function and a derivative function.

12. The method as defined in claim 10, wherein the at least one digitally derived signal is derived based on the set point and the measured output of the generator.

13. The method as defined in claim 12, wherein the at least one digitally derived signal is derived based on a demand signal supplied to the generator.

14. The method as defined in claim 13, wherein the at least one control parameter is associated with at least one of a proportional function, an integral function and a derivative function.

15. The method as defined in claim 10, wherein the at least one control parameter is associated with a frequency response.

16. A control system for controlling an electric generator coupled to a gas turbine engine, the control system comprising:
    a primary analog means for controlling the electric generator based on a set point and a measured output of the generator; and
    a digital control means of the gas turbine engine connected to the primary analog means via at least one digital-to-analog converter configured to hold at least one last value received from the digital control means, the digital control means being configured to supervise the operation of the primary analog means;
    wherein the primary analog means is configured to control the electric generator during an interruption in the operation of the digital control means using the at least one last value received from the digital control means.

17. The control system as defined in claim 16, wherein the digital control means is configured to modify at least one control parameter within the primary analog means.

18. The control system as defined in claim 17, wherein the at least one control parameter is associated with at least one of a proportional function, an integral function and a derivative function.

19. The control system as defined in claim 17, wherein the at least one control parameter is associated with a frequency response.

20. The control system as defined in claim 16, wherein the digital control means comprises a full authority digital engine controller.

* * * * *